United States Patent [19]

Elmer

[11] 4,035,654
[45] July 12, 1977

[54] OPTICAL ALIGNMENT SENSOR

[76] Inventor: Frank J. Elmer, 308 Highway 71, Spring Lake Heights, N.J. 07762

[21] Appl. No.: 648,351

[22] Filed: Jan. 12, 1976

[51] Int. Cl.² .................................. G01M 21/00
[52] U.S. Cl. ........................ 250/491; 250/338; 250/342
[58] Field of Search .......... 250/342, 338, 385, 491

[56] References Cited

U.S. PATENT DOCUMENTS

| 2,392,873 | 1/1946 | Zahl | 250/342 |
|---|---|---|---|
| 2,942,117 | 6/1960 | Maxwell | 250/342 |
| 2,999,161 | 9/1961 | Lovoff | 250/342 |
| 3,221,168 | 11/1965 | Patterson | 250/342 |
| 3,230,376 | 1/1966 | Goetze et al. | 250/342 |
| 3,405,268 | 10/1968 | Brunton | 250/358 |
| 3,450,479 | 6/1969 | Dauber | 250/342 |
| 3,845,310 | 10/1974 | Perraudin | 250/385 |
| 3,942,012 | 3/1976 | Boux | 250/385 |
| 3,955,089 | 5/1976 | McIntyre | 250/491 |

Primary Examiner—Harold A. Dixon
Attorney, Agent, or Firm—Nathan Edelberg; Jeremiah G. Murray; Daniel D. Sharp

[57] ABSTRACT

Method and apparatus for determining the accurate alignment of an intense optical beam wherein the beam is passed through a preselected region of an optical transmission element which absorbs a small amount of power transmitted therethrough producing a temperature distribution which is measured by appropriately placed thermal sensors whereupon the ratio of the temperature differences between the selected regions as measured by the thermal sensors provides an accurate indication of the beam's position and any deviations from a predetermined path.

13 Claims, 2 Drawing Figures

OPTICAL ALIGNMENT SENSOR

The invention described herein may be manufactured and used by or for the Government for governmental pruposes without the payment of any royalties thereon or therefor.

CROSS REFERENCE TO RELATED APPLICATION

This invention is related to U.S. Ser. No 648,350, entitled "Transparent Optical Power Meter", filed in the name of Frank J. Elmer on Jan. 12, 1976, the inventor of the present invention, and which is also assigned to the same assignee.

BACKGROUND OF THE INVENTION

This invention relates generally to optical measuring apparatus and more particularly to a method and apparatus for determining the accurate alignment of an intense optical beam, typically but not restricted to a laser beam. One method for determining alignment of a laser beam for example, is taught in U.S. Pat. No. 3,915,574, whereupon a laser beam of coherent light having a plurality of components of different frequencies is projected along a path of alignment through an ambient medium having a varied index of refraction, detecting the components and then measuring the separation of the beam components.

SUMMARY

Briefly, the subject invention is directed to a method and means for determining the alignment of an intense optical beam by passing the beam through a transmissive optical element such as a lens or window having a plurality of at least three thermal sensors located on the face of or embedded in the element. By sensing the temperature difference between the thermal sensors a null position for proper alignment is determined which when continuously sensed is useful in realigning the optical beam.

DESCRIPTION OF THE PREFERRED EMBODIMENT

Any material which permits optical radiation to pass through it absorbs a certain percentage of the incident power and dissipates it in the form of heat. This raises the temperature of the illuminated region and causes a temperature rise in the material which can be detected and measured by appropriately placed thermal sensors. The ratio of the temperature differences between the thermal sensors depends only on the position of the illuminated region and not on the intensity of the beam as long as the beam is strong enough to produce a detectable response by the thermal sensors themselves.

Figure 1:
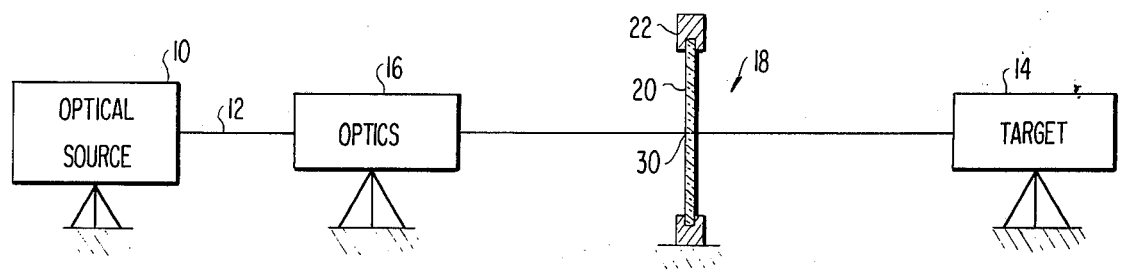
FIG. 1 is a diagram helpful in understanding the subject invention.

Referring now to the drawings, FIG. 1 discloses an optical source 10 which is adapted to produce an intense optical beam. This source may be for example a laser, but when desirable, may comprise a device such as a high intensity projector lamp, narrow beam flood light, or a high intensity lamp for laser pumping, etc. The optical beam 12 emitted from the source 10 is directed to a target 14 through an optical subsystem 16 which is adapted to direct the beam to a predetermined spot on the target. Intermediate the optical subsystem 16 and the target 14, is located an optical alignment sensor 18 which comprises the subject invention. When desirable, a second optical alignment sensor can be located intermediate the optical source 10 and the optics 16, or the optical alignment sensor 18 may be integral with the subsystem 16.

Figure 2:
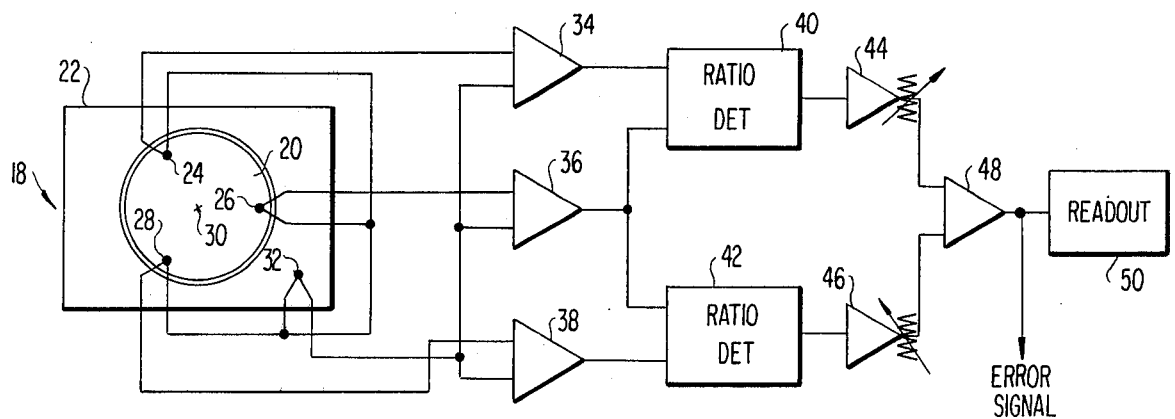
FIG. 2 is a block diagram illustrative of the preferred embodiment of the subject invention.

Referring now to FIG. 2, the alignment sensor 18 shown in FIG. 1 is comprised of an optical element 20 such as a lens or window through which the beam 12 is adapted to pass substantially unobstructed therethrough. The optical element 20 is contained in a suitable mounting structure 22 which may consist of for example, a metal frame of any selected design. There is a set of beam locations which will produce the same temperature ratios in a given pair of thermal sensors; however, by proper placement of the sensors, it is possible to have the equal temperature ratio beam locii of each possible combination of two thermal sensors intersect at one and only one point. Accordingly, a minimum of three thermal sensors 24, 26 and 28 are required to provide unambiguous results. Additionally, a fourth thermal sensor 32 is placed on the mounting structure 22 and is adapted to provide an ambient or reference temperature measurement in the manner taught in the above referenced related application, U.S. Ser. No. 648,350, entitled "Transparent Optical Power Meter".

As noted, any material which allows optical radiation to pass through it absorbs a certain percentage of the incident power and dissipates it in the form of heat. This raises the temperature of the illuminated region, for example, the region surrounding the point 30 shown in FIG. 2, and causes a temperature rise in the material relative to an ambient medium. The material from which the optical element 20 is fabricated is preferably chosen to have an optical power absorption characteristic which is substantially independent of the power in the optical beam passing therethrough. For IR laser applications, silicon, germanium, or zinc selenide have selected infra-red transmission characteristics and are particularly suitable materials for the optical element 20.

The termperature sensors 24, 26, 28 and 32 preferably comprise and are shown in the drawing as consisting of thermocouples, but when desirable, may consist of thermistors or temperature sensitive semiconductive devices, in the manner taught in the above referenced related application, U.S. Ser. No. 648,350, entitled "Transparent Optical Power Meter".

Each of the thermocouples 24, 26, and 28 are coupled in series with the thermocouple 32 to a respective amplifier 34, 36 and 38 and as such the input signal to each of the amplifiers comprise the difference signal between the temperature sensed at each of the thermocouples and ambient temperature. The outputs from amplifiers 34 and 36 are fed to a first ratio detector 40 while the outputs from amplifiers 36 and 38 are fed to a second ratio detector 32. A pair of variable offset amplifiers 44 and 46 are respectively coupled to the output of the ratio detectors 40 and 42, whose output in turn is fed to a summing amplifier 48. The output of the summing amplifier is used to drive a readout device and provide an error signal.

In operation, a laser beam, for example would be passed through a selected spot 30, which causes the region of the optical element 20 surrounding the spot to rise in temperature with respect to ambient, ambient being sensed by the thermocouple 32. Thermocouples 24, 26 and 28, respectively sense the temperature change thereat, whereupon the output of the offset amplifiers 44 and 46 fed by the ratio detectors 40 and 42 are adjusted to provide a null at their respective outputs. With such adjustments, the output of the summing amplifier 48 should also be a null, which output can be coupled to a visual readout device 50 or can be utilized as an error signal for a servo system, not shown, utilized for example in an automatic self correcting alignment system, which may include, for example, the optical subsystem 16. The computation of the thermal ratios and their deviation from the desired values can be accomplished when desirable digitally in a computer.

If the beam 12 should change in amplitude before reaching the device 18, the readout should continue to show a null; however, if the beam should move from the spot 30, for example, the readout should change due to the effect of the ratio detectors 40 and 42 operating on the outputs of the amplifiers 34, 36 and 38 which have changed accordingly.

If a second sensor configuration shown in FIG. 2 is interposed for example between the optical source 10 and the optical subsystem 16, the beam 12 would be constrained to two separate predetermined spots on the respective optical elements 20 and if the beam fails to intersect both optical alignment sensors in the proper spot the alignment can be considered to be off and corrective action initiated.

The present invention has several advantages. For example in systems using lasers, deviation of the beam from its desired position can easily be detected while the system is in operation. In other systems where it is possible to use a laser to align the system, the use of the alignment sensor taught by the subject invention provides an easy means for obtaining rapid checks on the system alignment. Furthermore, the technique set forth herein is applicable in systems which cannot operate in the visible range of the spectrum and hence is useful where visible alignment techniques are impractical if not impossible. Finally calibration of the optical alignment sensor can be made while it is in place in the optical system. In addition, the output from any one of the amplifiers 34, 36 or 38 may be used to monitor the average power in the optical beam 12 when the beam is passing through the preselected spot 30 as taught in the related application, U.S. Ser. No. 648,350, entitled "Transparent Optical Power Meter".

Having thus disclosed what is at present considered to be the preferred embodiment of the subject invention,

I claim:
1. The method for determining accurate alignment of an optical beam in an optical system including an optical element, which system and optical element have a common optical axis, comprising the steps of:
   1. projecting said optical beam through the element of said system along the optical axis for producing a temperature distribution within said element resulting from slight absorption of energy from the transmitted optical beam.
   2. detecting at spaced regions of said element the temperature existing at each of said regions,
   3. detecting a reference temperature at a region thermally coupled to said optical element,
   4. combining the electrical signals derived from said detection for deriving an indication representative of said beam position,
   5. repeating steps (2) to (4) when said optical beam has become displaced from said optical axis, and
   6. determining the amount of said optical beam displacement as a function of the relative indications obtained in steps (4) and (5).

2. Apparatus for determining the alignment of an optical beam, comprising in combination:
   optical transmission means located in the path of said beam and having an optical absorption characteristic adapted to produce a temperature distribution therein surrounding the spot on said transmission means through which said beam passes which varies with the position of said spot;
   a plurality of temperature sensors arranged at at least three spaced points surrounding said spot for providing respective electrical signals indicative of the temperature of said points of said optical transmission means; and
   circuit means coupled to said respective signals for deriving an output signal the magnitude of which is representative of the displacement of said beam from said spot.

3. The apparatus as defined by claim 2 wherein said temperature sensors are mounted on said optical transmission means outside the path of said beam as it passes through said optical transmission means.

4. the apparatus as defined by claim 2 wherein said temperature sensors are comprised of thermocouples.

5. The apparatus as defined in claim 2 wherein said circuit means includes means for determining the ratio of the temperature differences between said plurality of temperature sensors.

6. The apparatus defined by claim 2 and including an additional reference temperature sensor disposed at a fixed point thermally coupled to said optical transmission means for providing an electrical signal indicative of the reference temperature at said fixed point and electrically coupled to each of said plurality of temperature sensors to provide respective output levels indicative of the temperature difference between each of said at least three points and said reference temperature.

7. The apparatus as defined by claim 6 wherein said reference temperature sensor is coupled to each of said plurality of temperature sensors in series.

8. The apparatus as defined by claim 6 wherein said optical transmission means includes a mounting structure and said reference temperature sensor is mounted on said mounting structure.

9. The apparatus as defined by claim 6 wherein said circuit means includes:
   means for connecting each of said plurality of sensors in series to said reference sensor providing at least three difference signals;
   first circuit means for providing the ratio of the first and second difference signals;
   second circuit means for providing the ratio between the second and third difference signal; and
   third means coupled to said first and second circuit means for providing the ratio of said difference signals to provide an output indicative of the comparision of said ratios.

10. The apparatus as defined by claim 9 wherein said first and second circuit digital computer circuit means.

11. The apparatus as defined by claim 9 wherein sid third circuit means for providing said comparison comprises a summing amplifier.

12. The apparatus as defined by claim 11 wherein said first and second circuit means comprise first and second ratio detectors and additionally including respective variable offset amplifiers couples from said ratio detectors to said summing amplifier and being adapted to produce a null signal input to said summing amplifier for a selected focal spot.

13. The apparatus as defined by claim 12 and additionally including respective amplifier means coupling said difference signals to said ratio detectors.

* * * * *